(12) United States Patent
Tikhov et al.

(10) Patent No.: US 7,828,222 B2
(45) Date of Patent: Nov. 9, 2010

(54) RADIO FREQUENCY IDENTIFIER TAG AND METHOD OF FABRICATION

(75) Inventors: Yuri Tikhov, Suwon-si (KR); Younghoon Min, Anyang-si (KR); Yong-Wook Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/635,015

(22) Filed: Dec. 10, 2009

(65) Prior Publication Data

US 2010/0147959 A1 Jun. 17, 2010

(30) Foreign Application Priority Data

Dec. 11, 2008 (KR) ............... 10-2008-0125972

(51) Int. Cl.
*G06K 19/06* (2006.01)
(52) U.S. Cl. ............... 235/492; 340/572.7; 340/572.8
(58) Field of Classification Search ........... 235/492; 340/572.7, 572.8
See application file for complete search history.

(56) References Cited

U.S. PATENT DOCUMENTS

| | | | | |
|---|---|---|---|---|
| 6,317,027 | B1* | 11/2001 | Watkins | 340/10.1 |
| 7,317,303 | B1* | 1/2008 | DeVilbiss | 323/223 |
| 2007/0008662 | A1* | 1/2007 | Bhakta | 361/3 |
| 2007/0046475 | A1* | 3/2007 | Carrender | 340/572.7 |
| 2007/0257800 | A1* | 11/2007 | Yang et al. | 340/572.7 |
| 2008/0100422 | A1* | 5/2008 | Tuttle et al. | 340/10.1 |
| 2008/0129629 | A1* | 6/2008 | Kimura et al. | 343/788 |
| 2008/0252462 | A1* | 10/2008 | Sakama | 340/572.7 |
| 2009/0121014 | A1* | 5/2009 | Tharp et al. | 235/380 |
| 2009/0315320 | A1* | 12/2009 | Finn | 283/107 |

FOREIGN PATENT DOCUMENTS

| JP | 2001060258 A | 3/2001 |
|---|---|---|
| JP | 2002353725 A | 12/2002 |
| JP | 2006195842 A | 7/2006 |

* cited by examiner

*Primary Examiner*—Allyson N Trail
(74) *Attorney, Agent, or Firm*—Volentine & Whitt, PLLC

(57) ABSTRACT

Disclosed is a radio frequency identifier tag having a microchip with first and second contact nodes, an antenna formed by a conductive line connected between the first and second contact nodes, and first and second conductive line segments connected in parallel and to the first and second contact nodes to form a tail capacitance modifying the antenna capacitance.

20 Claims, 14 Drawing Sheets

US 7,828,222 B2

RADIO FREQUENCY IDENTIFIER TAG AND METHOD OF FABRICATION

CROSS-REFERENCE TO RELATED APPLICATIONS

This U.S. non-provisional patent application claims priority under 35 U.S.C §119 to Korean Patent Application No. 10-2008-0125972 filed Dec. 11, 2008, the subject matter of which is hereby incorporated by reference.

BACKGROUND

The present inventive concept relates to radio frequency identifier (RFID) devices, such as RFID tags and methods of fabricating same.

A RFID system is a contactless identification system configured to exchange information between a RFID terminal device (e.g., "a RFID reader") and one or more RFID tags. In general, a RFID tag does not include an internal power supply source. Rather, a RFID tag operates using power derived in a contactless manner from the RFID reader. For example, a RFID tag may be supplied with power from the RFID reader using inductive coupling or electromagnetic coupling.

SUMMARY

Embodiments of the inventive concept provide a RFID tag capable of adjusting its constituent resonance frequency and quality factor.

In one aspect, an embodiment of the inventive concept provides a radio frequency identifier (RFID) tag comprising; a microchip having first and second contact nodes, an antenna formed from a conductive line extending between the first and second contact nodes and characterized by an antenna capacitance, and first and second conductive line segments respectively connected with the first and second contact nodes to form a tail capacitance modifying the antenna capacitance.

In another aspect, an embodiment of the inventive concept provides a method of fabricating a radio frequency identifier (RFID) tag, comprising; connecting a conductive line between first and second contact nodes of a microchip to form an antenna having an antenna capacitance, and connecting parallel first and second conductive line segments each a first length to the first and second contact nodes to form a tail capacitance modifying the antenna capacitance.

BRIEF DESCRIPTION OF THE DRAWINGS

Non-limiting and non-exhaustive embodiments of the inventive concept will be described with reference to the following drawings, wherein like reference numbers and labels indicate like elements. In the drawings.

DETAILED DESCRIPTION OF EMBODIMENTS

The inventive concept will now be described in some additional detail with reference to accompanying drawings. For ease of description, the general class of radio frequency identifiers will be described in the context of one or more RFID tag(s), but those skilled in the art will understand that various radio frequency identifiers may be configured consistent with embodiments of the inventive concept using many different form factors.

Figure 1:
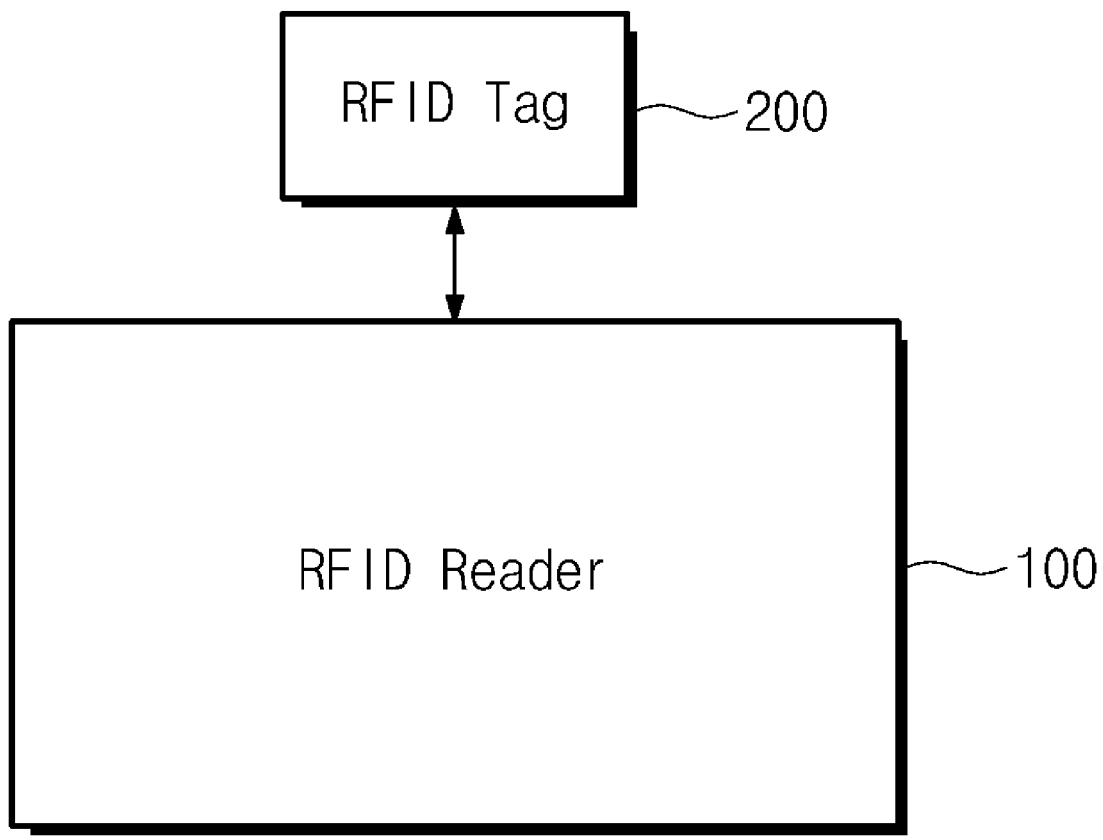
FIG. 1 is a general block diagram illustrating a RFID system according to an embodiment of the inventive concept.

FIG. 1 is a general block diagram of a RFID system 10 according to an embodiment of the inventive concept. Referring to FIG. 1, the RFID system 10 comprises a RFID reader 100 and a RFID tag 200. The RFID reader 100 supplies a power and communicates data to/from the RFID tag 200 in a contactless manner. For example, the RFID reader 100 may supply a power to the RFID tag 200 via inductive coupling. Alternatively, the RFID reader 100 may supply a power to the RFID tag 200 via electromagnetic coupling. For simplicity of description, it is assumed hereafter that the RFID reader 100 supplies power to the RFID tag 200 using an inductive coupling technique.

Figure 2:
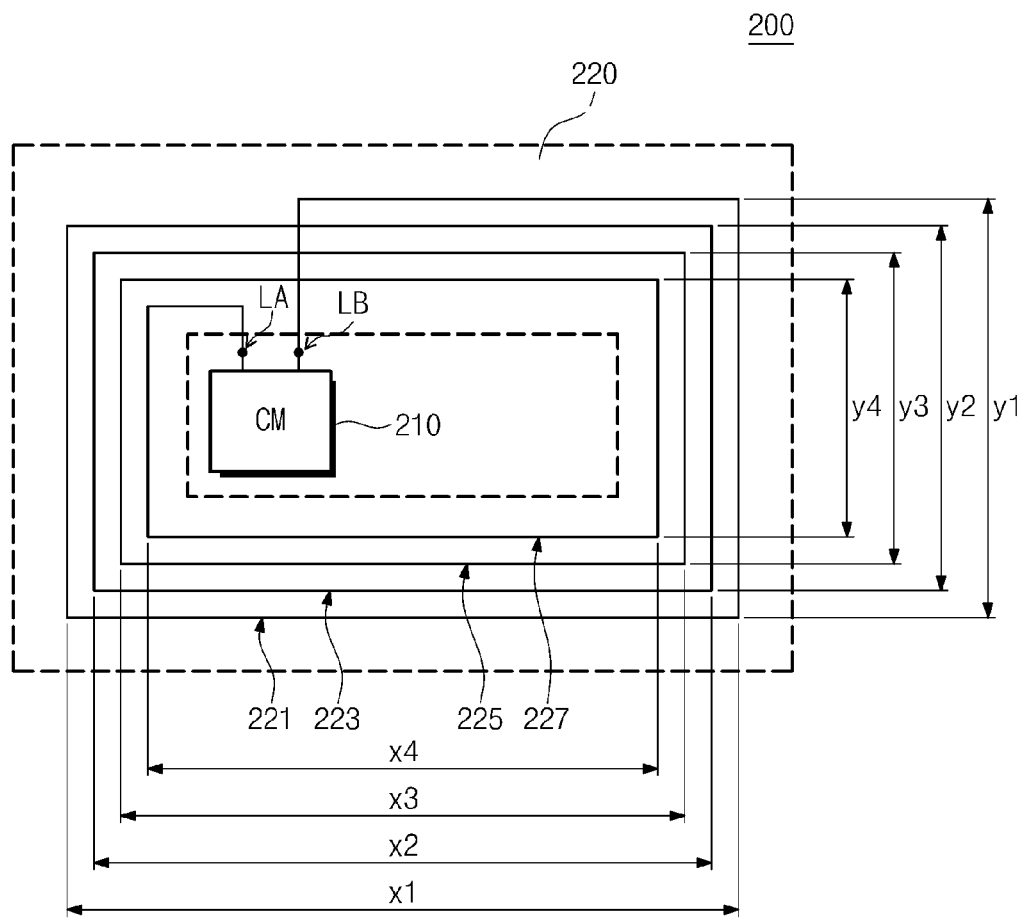
FIG. 2 is a block diagram further illustrating the RFID tag of FIG. 1 according to an embodiment of the inventive concept.

FIG. 2 is a block diagram further illustrating the RFID tag 200 of FIG. 1 according to an embodiment of the inventive concept. Referring to FIG. 2, the RFID tag 200 comprises a microchip 210 and an antenna 220. The microchip 210 (e.g., a modularly formed device) is supplied with power from an electrical signal received via the antenna 220. Once power is supplied, the microchip 210 is able to perform a variety of computational and communications operations. Such operations are well known in the art.

The antenna 220 is formed by laying out (or "winding") a conductive line in one direction. For example, in FIG. 2 the conductive line is wound in a counterclockwise direction beginning from a first contact node LA to a second contactless node LB. However, this is just one example of an antenna layout pattern. The two-dimensional plane in which the antenna 220 is laid out is termed an antenna plane. As is appreciated by those skilled in the art, the conductive line forming the antenna 220 has an inductance. Thus, if a magnetic field impinges the antenna plane at an intersecting angle, an electrical current will flow through the conductive line forming the antenna 220. The direction of current flowing through the antenna 220 is dependent upon the impinging direction of the magnetic field.

Referring to the example illustrated in FIG. 2, the conductive line forming the antenna 220 begins at the first contact node LA, makes four (4) expanding turns around the antenna plane, and then terminates at the second contact node LB. Within this configuration, the outermost turn of the conductive line (i.e., the turn closest to the periphery of the substrate forming the antenna plane) will be referred to as the first turn 221. The innermost turn of the conductive line terminating at the first contact node LA will be referred to as the fourth (or Nth) turn 227. All other turns of the conductive line between the first turn and the Nth turn are referred to as intervening turns, or in the context of the illustrated embodiment of FIG. 2, the second and third turns 223 and 225, respectively.

The greatest area (a first area) occupied by the antenna 220 has the shape of a rectangle defined in the illustrated embodiment by the first turn 221 and is equal to the product of a first ("X") dimension x1 and second ("Y") dimension y1. Lesser areas (second through fourth areas) occupied by portions of the antenna 220 defined by the second and subsequent turns (i.e., second through fourth turns) are respectively defined by corresponding first and second dimensions (e.g., x2 and y2, x3 and y3, and x4 and y4). The above-described areas will be more fully described with reference to FIGS. 13 through 17. Those skilled in the art will recognize that any reasonable number of conductive line turns may be used to implement an antenna between a first and second contact node.

Figure 3:
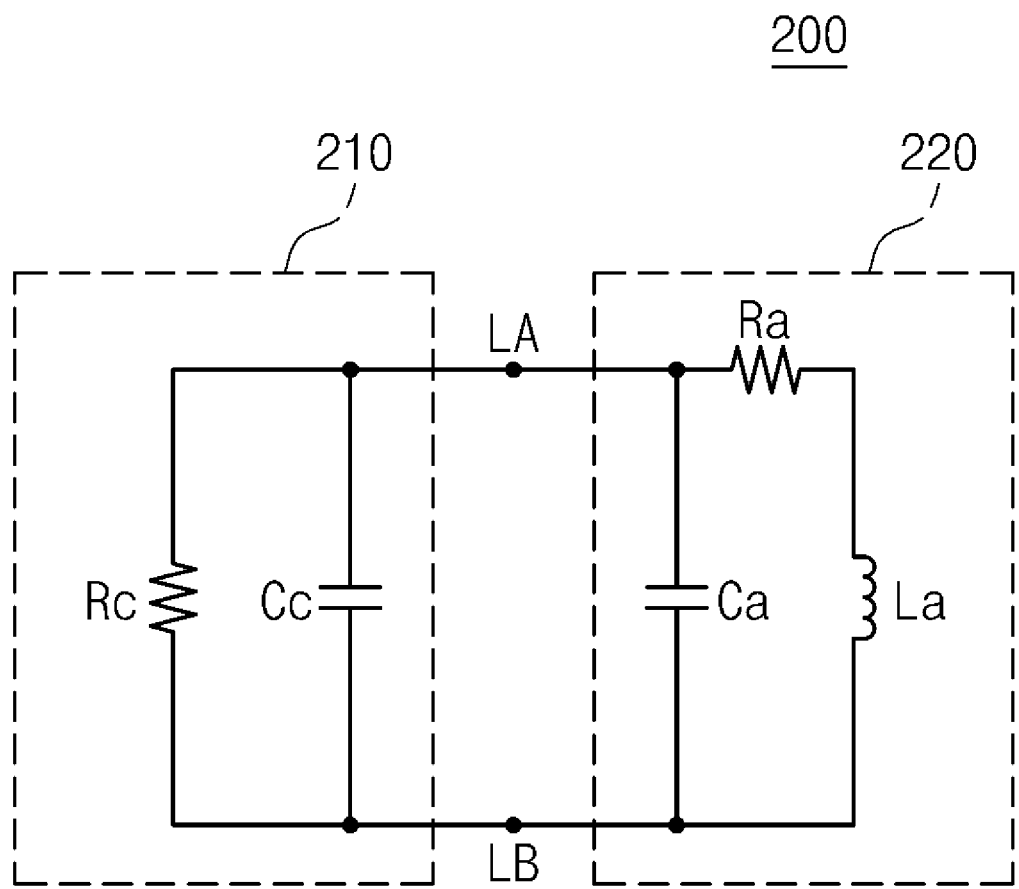
FIG. 3 is a circuit diagram illustrating an equivalent circuit for the RFID tag of FIG. 2.

FIG. 3 is an equivalent circuit for the RFID tag 200 of FIG. 2. Referring to FIGS. 2 and 3, the microchip 210 of RFID tag 200 may be modeled as first resistance Rc and a first capacitance Cc connected in parallel between the first and second contact nodes LA and LB. That is, the first resistance Rc corresponds to the resistance (e.g., load resistance) of the microchip 210 and the first capacitance Cc corresponds to the capacitance (e.g., input capacitance) of the microchip 210.

The antenna 220 of RFID tag 200 may be modeled as a second resistance Ra and an inductor La serially connected between the first and second contact nodes LA and LB and a second capacitance Ca connected between the first and second contact nodes LA and LB. The inductor La corresponds to the inductance of the antenna 220 formed by "N" winding a conductive line between the first and second contact nodes LA and LB. The second resistance Ra corresponds to the resistance of the conductive line. That is, the second resistance Ra is a measure of the ohmic loss related to the antenna 220 and inherent in the N windings of the conductive line. The second capacitance Ca includes the various parasitic capacitances associated with the N turns (i.e., the first through fourth turns 221 to 227) of the conductive line forming the antenna 220.

The resonance frequency "fr" of the RFID tag 200 illustrated in FIG. 3 may be expressed by the following equation, $$f_r = \frac{1}{\sqrt{LC}}$$

wherein the capacitance C is the sum of the first and second capacitances Cc and Ca and the inductance L is equal to the inductor La.

Hence, the resonance frequency of the RFID tag is a function of the capacitance of the first capacitance Cc associated with the microchip 210 and the inductance and the second capacitance La and Ca associated with the antenna 220.

Figure 4:
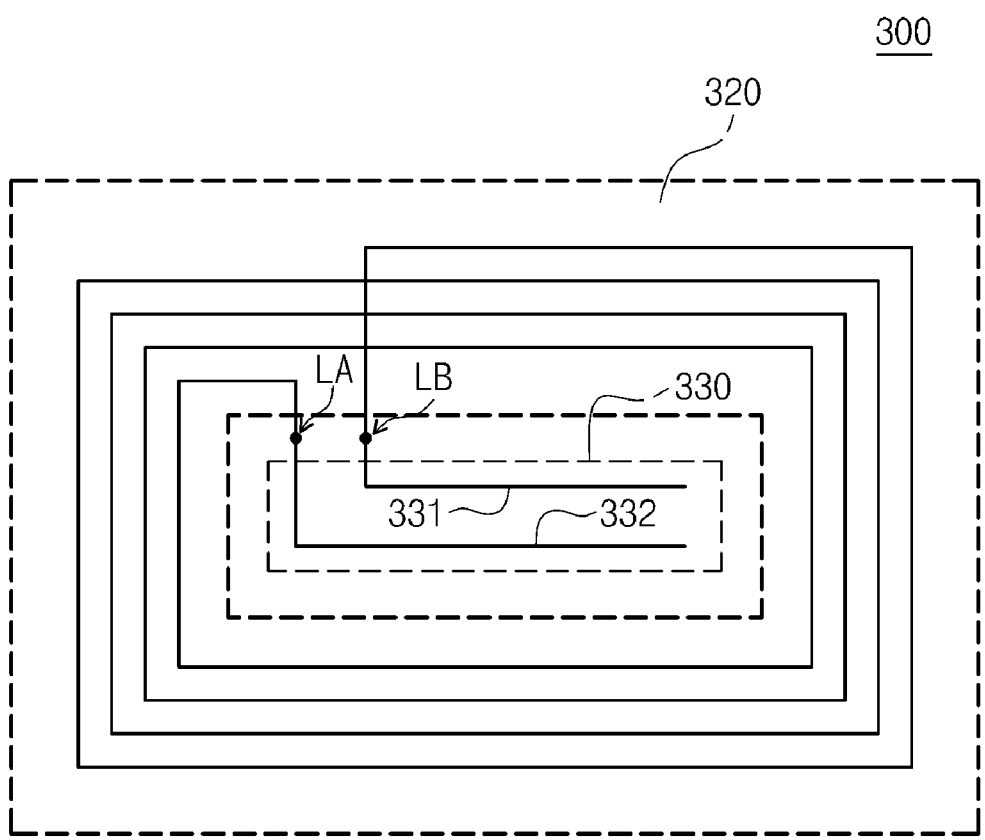
FIG. 4 is a block diagram illustrating a RFID tag according to an embodiment of the inventive concept.

FIG. 4 is a diagram illustrating a RFID tag 300 according to another embodiment of the inventive concept. Referring to FIG. 4, the RFID tag 300 comprises a microchip like the embodiment of FIG. 2, albeit not shown in FIG. 4, and an antenna 320 formed by a conductive line including twin tail portions (or "tails") 330.

The antenna 320 is connected between the first and second contact nodes LA and LB and comprises a conductive line coil formed by multiple "N" windings in one direction. The antenna 320 is configured to supply an electrical current powering a connected microchip in the presence of an externally applied magnetic field (e.g., a magnetic field generated by the RFID reader 100 of FIG. 1) via inductive coupling.

The tails 330 are respectively connected with the antenna 320 via the first and second contact nodes LA and LB. In the illustrated embodiment of the inventive concept, the tails 330 comprises first and second conductive line segments 331 and 332 which are disposed in parallel. In the illustrated embodiment of the inventive concept, the first and second conductive line segments 331 and 332 are centrally located within the coil of the antenna 320. Alternatively, the first and second conductive line segments 331 and 332 may be incorporated into the antenna 320 by extending the conductive line in the winding direction to form tails 330 not connected through the first and second contact nodes.

Figure 5:
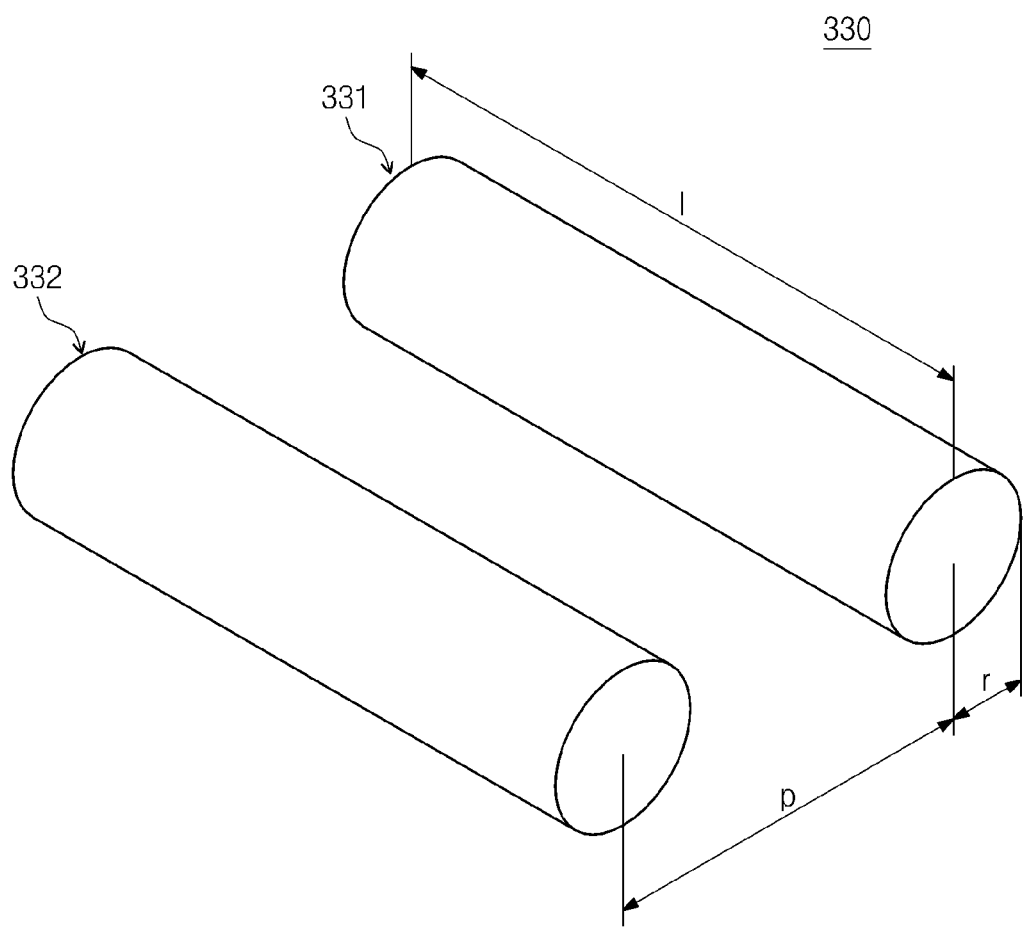
FIG. 5 is a diagram further illustrating so-called "tails" of the RFID tag of FIG. 4.

FIG. 5 is a diagram further illustrating the tails 330 of the RFID tag 300 of FIG. 4. Referring to FIGS. 4 and 5, tails 330 include first and second conductive line segments 331 and 332 disposed in parallel. In the illustrated embodiment of FIG. 5, the first and second conductive line segments 331 and 332 are formed with a common thickness (e.g., a same diameter or radius of the conductive line forming the antenna 320). The physical size (i.e., the diameter of the conductive line segments) and layout relationship (i.e., a separating gap) of the first and second conductive line segments 331 and 332 will define, at least in part, the second capacitance Ca of FIG. 3. This, it may be assumed in relation to the illustrated embodiment that the first and second conductive line segments 331 and 332 have a radius 'r' and a length 'l'. Further, it is assumed that a separating gap between the first and second conductive line segments 331 and 332 is 'p'. With these assumptions, a tail capacitance "Ct" associated with the first and second conductive line segments 331 and 332 may be expressed by the equation, $$C_t = \frac{0.00885 \times l \times \pi \times \varepsilon}{ln(p-r)/r}$$

where '∈' is the effective dielectric constant of the material within the separating gap "p" and Ct is measured in units of pF.

As is understood by those skilled in the art, the effective dielectric constant is a function of the material(s) filling the separation gap p between the first and second conductive line segments 331 and 332. In many embodiments of the invention, the separation gap between the first and second conductive line segments 331 and 332 is filled with an insulation material forming the substrate or body of the RFID tag 300.

Figure 6:
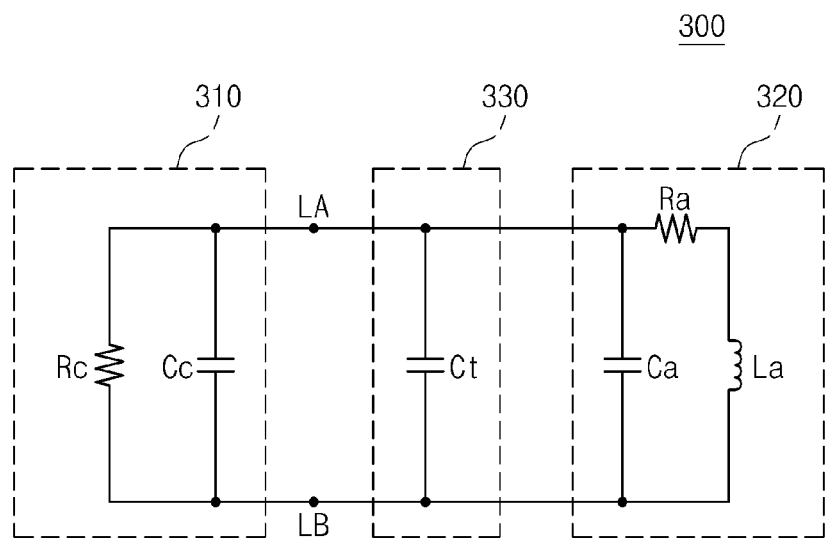
FIG. 6 is a circuit diagram illustrating an equivalent circuit for the RFID tag of FIG. 4.

FIG. 6 is an equivalent circuit diagram for the RFID tag 300 of FIG. 4. Referring to FIGS. 4 and 6, the RFID tag 300 comprises a microchip 310, an antenna 320, and tails 320. As described with reference to FIG. 3, the microchip 310 may again be modeled by a first resistance Rc and a second capacitance Cc connected in parallel between the first and second contact nodes LA and LB. The antenna 320 may be modeled by the second capacitance Ca connected between the first and second contact nodes LA and LB, a second resistance Ra, and an inductor La connected in series with the second resistance Ra between the first and second contact nodes LA and LB.

As described with reference to FIG. 5, parallel-disposed conductive line segments 331 and 332 forming tails 330 have a tail capacitance Ct. Accordingly, tails 330 may be modeled within the equivalent circuit diagram of FIG. 6 by tail capacitor Ct connected between the first and second contact nodes LA and LB.

With reference to the resonance frequency fr for the RFID tag 300, the total capacitance C of the foregoing expression is now the sum of the first capacitance Cc associated with the microchip 310, the second capacitance Ca associated with the antenna 320, and the tail capacitance Ct associated with the tail 330. Further, the tail capacitance Ct is proportional to the length "l" (refer to FIG. 5) of the first and second conductive line segments 331 and 332 forming the tails 330. Thus, it is possible to adjust the tail capacitance Ct by adjusting the length of the constituent first and second conductive line segments 331 and 332.

Figure 7:
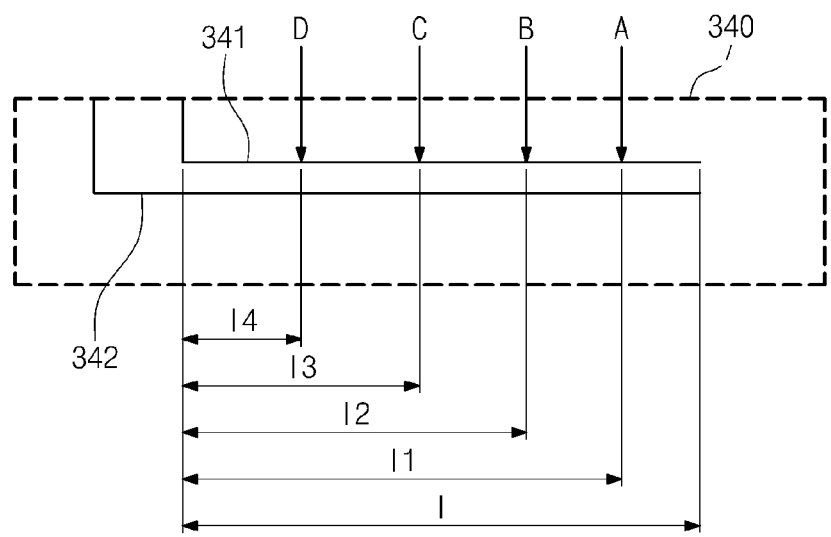
FIG. 7 is a diagram conceptually illustrating a method of adjusting the tails of a RFID tag according to an embodiment of the inventive concept.

FIG. 7 is a diagram describing an adjustment method for the tail 330 of the RFID tag 300 of FIGS. 4 to 6. Referring to FIGS. 4 to 7, it is assumed that each of the first and second conductive line segments 341 and 342 has a first length 'l. If the first and second conductive line segments 341 and 342 are trimmed back to node A, the first length "l" is reduced to a second length 'l1'. Accordingly, the tail capacitance Ct may be changed from a first value corresponding to the first length 'l' to the second length "l1". Similar trimming steps for the first and second conductive line segments 341 and 342 back to, for example, nodes B through D will similarly change the tail capacitance Ct.

Figure 8:
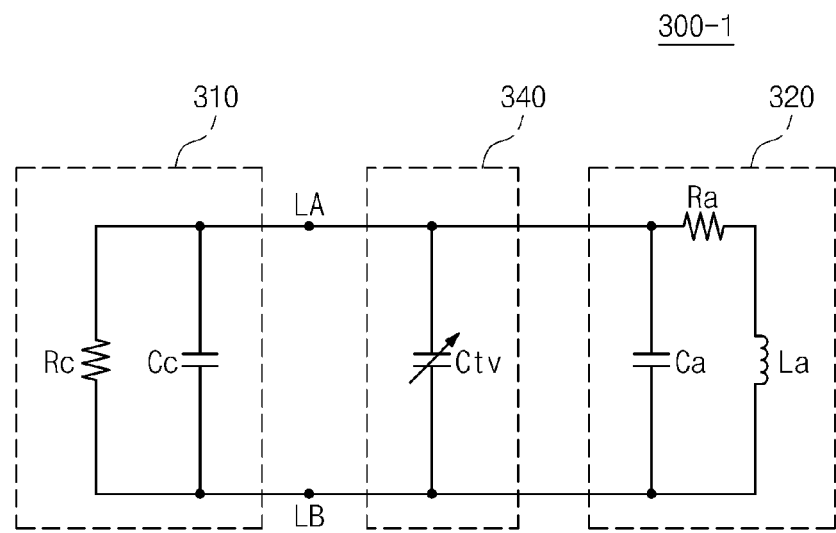
FIG. 8 is a circuit diagram illustrating an equivalent circuit of a RFID tag varying the lengths of conductive lines forming tails.

In view of the foregoing, FIG. 8 is an equivalent circuit diagram for a RFID tag 300-1 of FIG. 7, wherein a variable length for the first and second conductive line segments may change the corresponding tail capacitance. The equivalent circuit diagram of FIG. 8 is similar to the equivalent circuit diagram of FIG. 6, except fixed tail capacitance element Ct is replaced in FIG. 6 with a variable tail capacitance Ctv in FIG. 8.

As described above, the resonance frequency fr of the RFID tag 300-1 is inversely proportional to the square root of the variable tail capacitance Ctv of the RFID tag 300-1. Thus, the total capacitance C of the RFID tag 300-1 is the sum of the first capacitance Cc associated with the microchip 310, the second capacitance Ca associated with the antenna 320, and the variable tail capacitance Ctv associated with trimmable tails 340. The term "trimmable" in this context refers to any RFID tag having one or more conductive line segments forming a tail portion that is susceptible to length trimming to thereby adjust a corresponding capacitance. Thus, it is possible to adjust the resonance frequency fr of the RFID tag 300-1 by varying the lengths of the first the second conductive line segments 341 and 342.

For example, the resonance frequency fr as defined in part by the length of the first and second conductive line segments 341 and 342 may be varied as follows. If it is assumed that the first (or initial) the length 'l' of the tails 340 is 8 mm, a resonance frequency of 13.48 MHz may be obtained in certain embodiments of the inventive concept. If however, this first length is trimmed back to 75, 70, 65, 60, 55, 50, 45, and 40 mm, then a respective resonance frequency of 13.50, 13.52, 13.55, 13.57, 13.59, 13.61, 13.63, and 13.66 MHz may be obtained.

Figure 9:
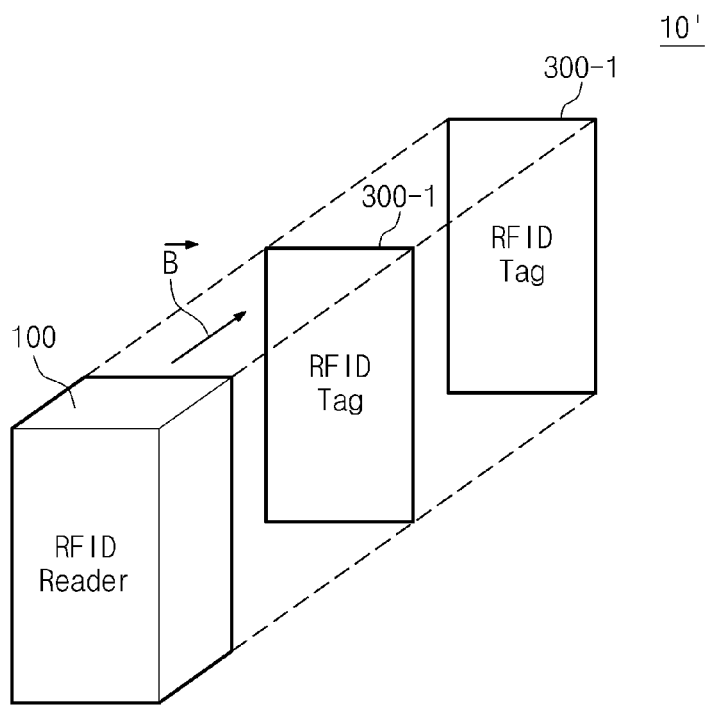
FIG. 9 is a diagram illustrating a RFID system including a RFID tag capable of adjusting its resonance frequency.

FIG. 9 is a block diagram illustrating a RFID system 10' according to an embodiment of the inventive concept that comprises one or more RFID tag(s) 300-1 consistent with the embodiment of FIG. 8, each having an adjustable resonance frequency. Referring to FIG. 9, the RFID system 10' also comprises the RFID reader 100. As is conventional, the RFID reader 100 supplies power to the RFID tags 300-1 via inductive coupling and communicates data to/from the RFID tags 300-1

In FIG. 9, the RFID tags 300-1 are disposed within an intersecting magnetic field B (having a field direction as indicated by the associated arrow) generated by the RFID reader 100. The resonance frequency of each one of the RFID tags 300-1 may be derived from the above equation. As illustrated in FIG. 9, since the RFID tags 300-1 are disposed to be overlapped in the magnetic field direction, mutual induction may be made between the RFID tags 300-1. The inductance of the RFID tags 300-1 disposed to an overlapping manner may be different from RFID tags 300-1 disposed in a non-overlapping manner, due to the influence of various mutual inductive forces.

As noted above, the resonance frequency of a RFID tag is inversely proportional to the square root of a total inductance L for the RFID tag. When the total inductance L of the RFID tag 300-1 is varied, its resonance frequency also varies, and if the resonance frequency of the RFID tag 300-1 is changed, it will not normally communicate with the RFID read 100.

As illustrated in FIGS. 7 and 8, the RFID tag 300-1 according to an embodiment of the inventive concept may be configured to vary its resonance frequency by adjusting the length of conductive line segments forming tails 330/340. Thus, as illustrated in FIG. 9, the resonance frequencies of multiple RFID tags 300-1 may be adjusted such that the multiple RFID tags 300-1 normally communicate with a single RFID reader 100. That is, it is possible to compensate for variations of an inductance due to the mutual induction by varying the respective resonance frequencies for RFID tags within a RFID system.

Figure 10:
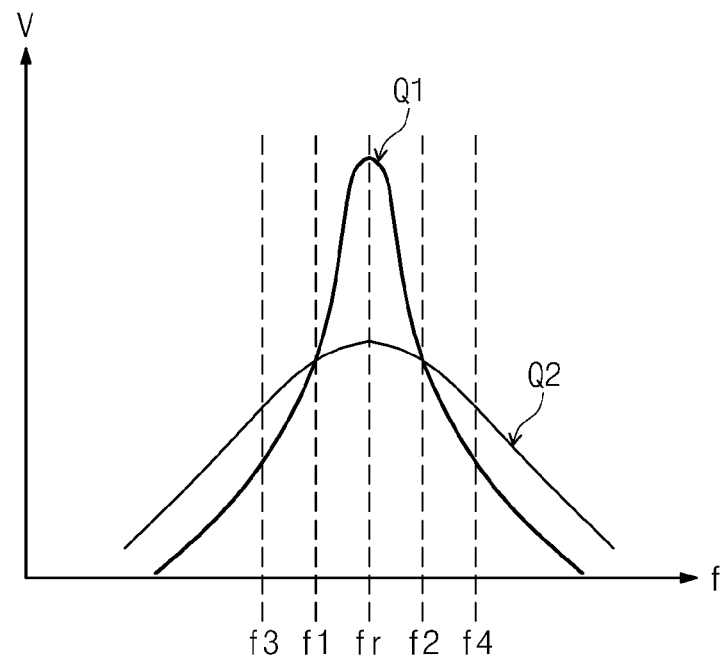
FIG. 10 is a graph equating an exemplary response characteristic with frequency for the RFID tag of FIG. 8.

FIG. 10 is a diagram illustrating response characteristics for a RFID tag with respect to a frequency. In FIG. 10, the horizontal axis indicates frequency and the vertical axis indicates a voltage. Curves Q1 and Q2 indicate response characteristics with respect to frequencies of resonant circuits (for example, RFID tag 300-1).

In the RFID tag 300-1, a quality factor "Q" indicates an increased degree of a voltage with a resonance frequency when the magnetic field is provided from the external. As the quality factor is improved, the level of the voltage with the resonance frequency is increased. For example, the quality factor may be a ratio of a resonance frequency to a bandwidth. The bandwidth indicates a frequency band where 50% of a signal power exists on the center of the resonance frequency. The quality factor of the RFID tag 300-1 may be expressed by the following equation.

$$Q = \frac{1}{Ra\sqrt{\frac{C}{L} + \frac{1}{Rc}}\sqrt{\frac{L}{C}}} = \frac{1}{\frac{Ra}{2\pi \times fr \times L} + \frac{2\pi \times fr \times L}{Rc}}$$

The quality factor of the RFID tag 300-1 is determined according to a total inductance L being largely the inductance La associated with the RFID tag 300-1, the second resistance Ra associated with the antenna 320, the first resistance Rc associated with the microchip 310, and the resonance frequency fr. The RFID tag 300-1 is configured to vary the resonance frequency fr by changing the lengths of the first and second conductive line segments 341 and 342 forming the tails 340. Thus, it is possible to vary the quality factor of the RFID tag 300-1.

Referring again to the above equation, the resonance frequency fr is inversely proportional to the square root of a product of capacitance C and inductance L for the RFID tag 300-1. The inductance La of the antenna 320 and the total capacitance C of the RFID tag 300-1 are varied to be inversely proportional in order to change the lengths of the first and second conductive line segments 341 and 342 with the resonance frequency maintained constantly. That is, if the RFID tag 300-1 has tails 340 the effective length of the conductive line forming the antenna 320 may be varied by changing inductance La and resistance Ra associated with the antenna 320 by trimming the length of the tails, because it is understood that the quality factor Q is also varied by changes in the inductance La and resistance Ra associated with the antenna 320.

In one example, it is assumed that a frequency response characteristic of the RFID tag 300-1 corresponds to curve Q1 in FIG. 10. In this case, the resonance frequency fr for the RFID tag 300-1 and corresponding bandwidth functionally exist between a first frequency f1 and second frequency f2. In another example, it is assumed that a frequency response characteristic of the RFID tag 300-1 corresponds to curve Q1 in FIG. 10. In this second case, the resonance frequency fr of the RFID tag 300-1 and corresponding bandwidth exists between another first frequency f3 and another second frequency f4 (i.e., a broader bandwidth).

The bandwidth of the RFID tag 300-1 corresponding to the curve Q1 is less than that corresponding to the curve Q2. That is, the quality factor of the RFID tag 300-1 corresponding to the curve Q1 is higher than that corresponding to the curve Q2. For example, in case of the RFID tag 300-1 corresponding to the curve Q1, a voltage having the resonance frequency fr may be increased up to the first voltage. In case of the RFID tag 300-1 corresponding to the curve Q2, a voltage having the resonance frequency fr may be increased up to the second voltage lower than the first voltage. The identification distance of the RFID tag 300-1 corresponding to the curve Q1 is longer than that corresponding to the curve Q2. On the other hand, the communication efficiency (for example, a transfer amount) of the RFID tag 300-1 corresponding to the curve Q1 is lower than that corresponding to the curve Q2 due to a relatively less bandwidth.

According to a RFID tag consistent with an embodiment of the inventive concept, it is possible to vary the quality factor by adjusting the lengths of first and second conductive line segments 341 and 342 forming tails 340. Accordingly, a quality factor may be adjusted so as to emphasize the identification distance or the communication efficiency of the RFID tag 300-1 based on the use circumstances associated with the RFID tag 300-1.

In exemplary embodiments, adjusting of the lengths of the first and second conductive line segments 341 and 342 for the RFID tag 300-1 may be accomplished using physical or mechanical fabrication means. For example, the RFID tag 300-1 may be initially fabricated such that the first and second conductive line segments 341 and 342 have the first length "l". The resonance frequency fr and quality factor Q for the RFID tag 300-1 may then be adjusted by selectively trimming a portion of the first and second conductive line segments 341 and 342 using conventionally understood trimming techniques common to the fabrication of semiconductor devices. For example, the lengths of the first and second conductive line segments 341 and 342 may be trimmed (or adjusted) by punching out or laser trimming portions of the conductive lines.

Thus, a RFID tag according to an embodiment of the inventive concept may be configured to adjust the resonance frequency fr and quality factor Q by using various physical or mechanical trimming techniques. Thus, it is possible to fabricate RFID tags having various resonance frequencies and quality factors by adding the physical/mechanical process for varying the lengths of the conductive lines in the tail 340 to a process for fabricating the RFID tag 300-1.

Figure 11:
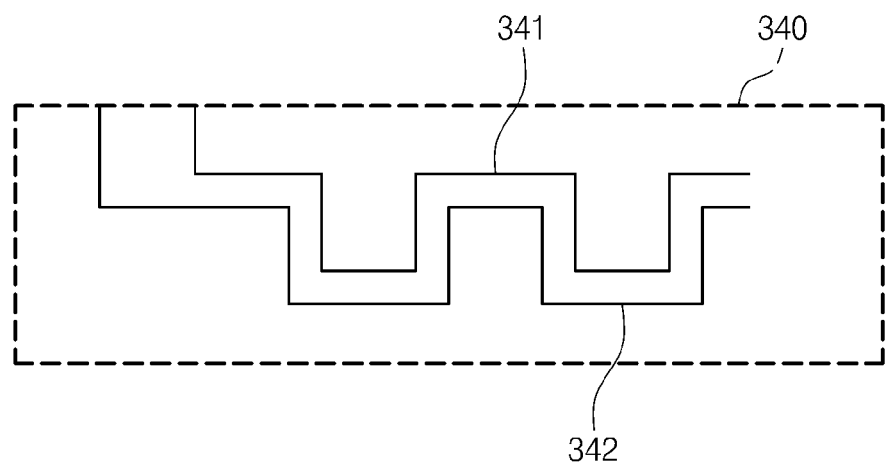
FIGS. 11 and 12 are diagrams illustrating possible tail configurations for the RFID tag of FIG. 7 according to certain embodiments of the inventive concept.
Figure 12:
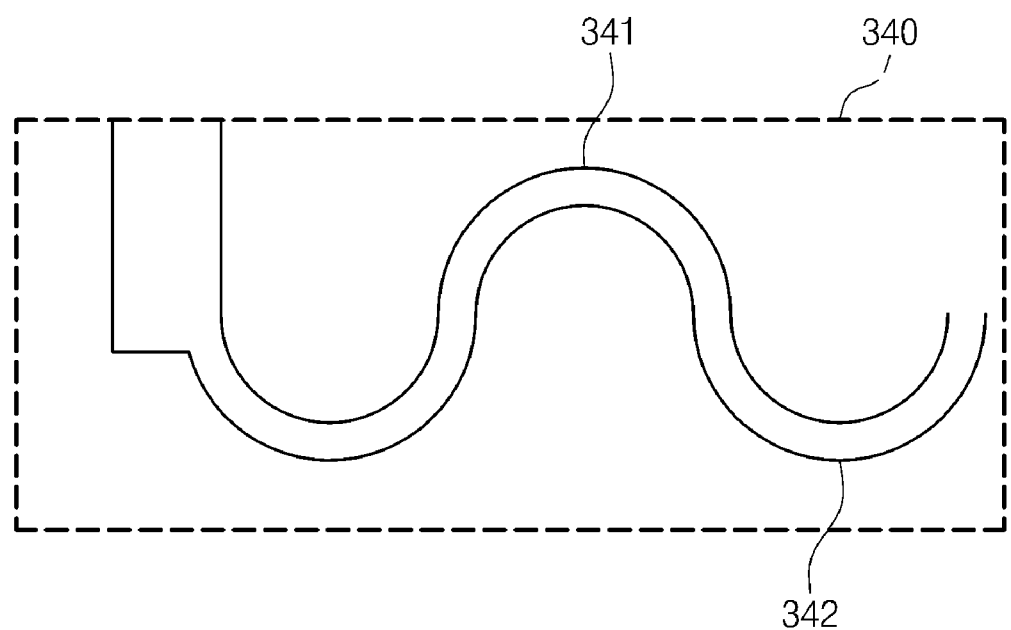

FIGS. 11 and 12 are diagrams showing additional embodiments of the inventive concept including tails 340. Referring to FIGS. 11 and 12, the first and second conductive line segments 341 and 342 forming the tails 340 remain parallel in their extension to form a tail capacitance Ct. However, in FIG. 11 the first and second conductive line segments 341 and 342 extend in a square wave pattern. In FIG. 12 the first and second conductive line segments 341 and 342 extend in a sine wave pattern. The layout disposition of the first and second conductive line segments 341 and 342 are limited to only the illustrated embodiments, but those skilled in the art will recognize other possible extension patterns within the context of the subject inventive concept.

Figure 13:
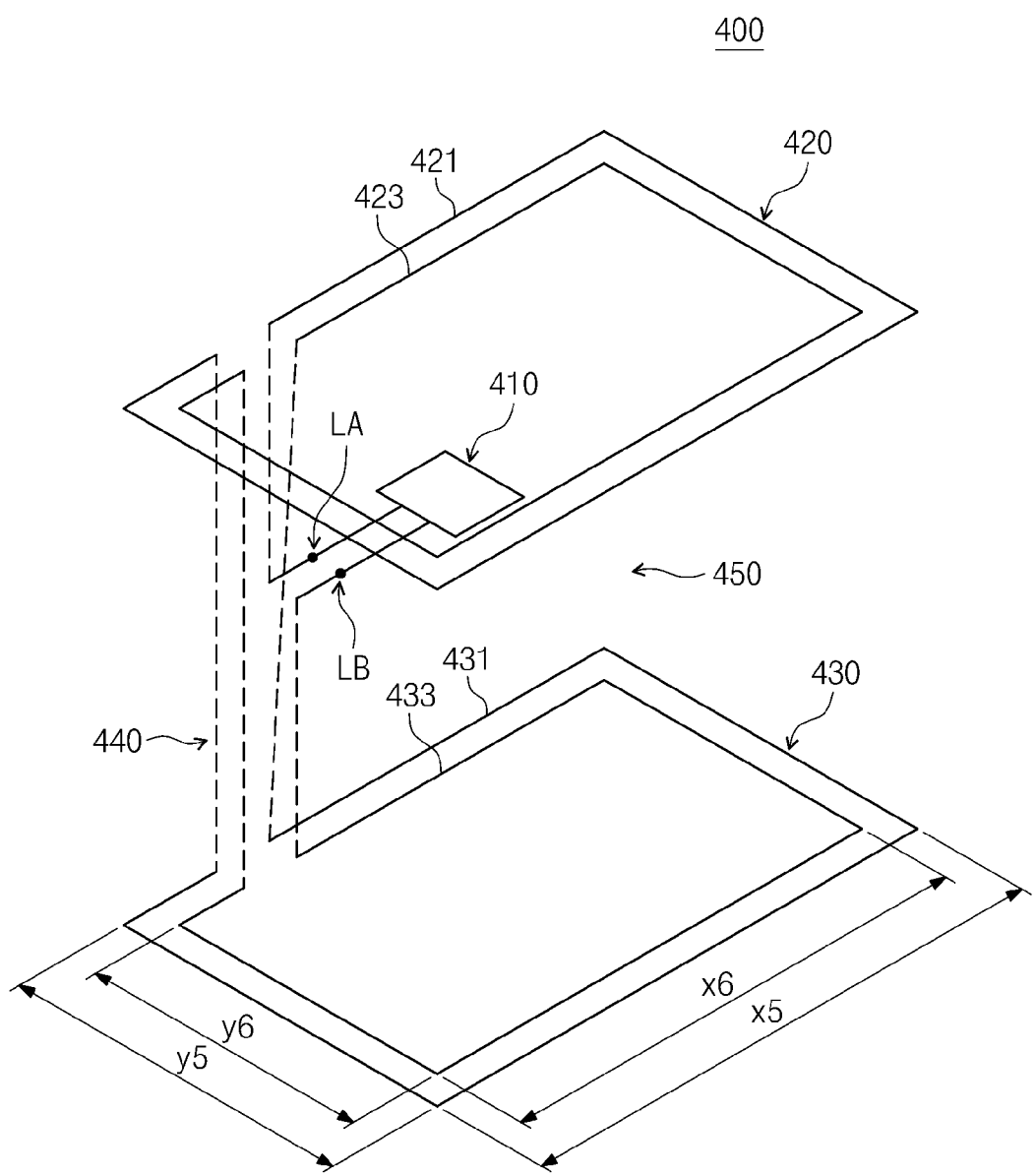
FIG. 13 is a diagram illustrating a RFID tag according to another embodiment of the inventive concept.

FIG. 13 is a diagram illustrating a RFID tag 400 according to another embodiment of the inventive concept. Referring to FIG. 13, the RFID tag 400 comprises a microchip 410, and conductive line forming an antenna 450. However, the antenna 450 is formed by conductive line windings (e.g., 2×) extending in first and second antenna planes 420 and 430. Conductive winding portions (e.g., a first antenna plane portion and a second antenna plane portion) disposed in the first and second antenna planes 420 and 430 may be connected via through holes (or vias) 440.

As before, the microchip 410 is provided with power derived via inductive coupling from the antenna and is configured to perform various conventionally understood operations. That is, the antenna 450 disposed in the first and second antenna planes 420 and 430 develops an electrical current when introduced into an externally generated magnetic field.

In the illustrated embodiment of FIG. 13, the conductive line begins at first contact node LA and extends in a first (outermost) upper turn 421 (e.g., in a right-hand direction) around the first (or upper) antenna plane 420, then descends through via holes 440 to form a first (outermost) lower turn 431 (in a left-hand direction) around the second (or lower) antenna plane 430. Thus, in the illustrated embodiment, the respective upper and lower turns may be formed in opposite directions.

In a similar manner the conductive line in the illustrated embodiment of FIG. 13 extends from the first lower turn 431 upwards through another via hole 440 to form a second upper turn 423 in the first antenna plane 420. The second upper turn of the conductive lines is formed within the first upper turn 421. Finally, the conductive lines again descend through another via hole 440 to form the second lower turn 433 in the second antenna plane 430. Collectively, these conductive line extensions form the antenna 450 of the RFID tag 400 with a final turn (e.g., the second lower turn 433 terminating at the second contact node LB).

In the illustrated embodiment, it is assumed that the layout shape of respective upper and lower turns (421/431 and 423/433) are the same within corresponding antenna planes. Here, rectangular windings are again formed to define winding loop areas having respective sizes equal to the product of related first and second dimensions (i.e., x5 and y5, and x6 and y6).

With reference to FIGS. 2 and 13, winding loop areas for the first through fourth turns (or for the first and second upper/lower turns) may be expressed as the product first and second dimensions (e.g., x1/y1, x2/y2, x3/y3, x4/y4, x5/y5, and x6/y6), respectively. As the number of windings of a conductive line increase per fixed unit substrate area, the winding loop area for each winding will decrease. The electrical current produced by inductive coupling increases as a function of the area of the coil formed by the conductive line. That is, a decrease in the winding loop area of a winding will cause a corresponding decrease in current produced by the conductive line. Thus, current generated by the first turn 221 in FIG. 2 is greater than the amount of current generated by the second turn 233, etc.

Returning to FIG. 13, the antenna 450 of the RFID tag 400 is formed by a conductive line winding through both first and second antenna planes 420 and 430. Thus, the conductive line is disposed in windings replicated in both the first and second planes 420/430. Thus, unlike the RFID tag 200 described in relation to FIG. 2, relatively larger (i.e., greater winding loop area), windings may be used to implement the antenna 450 of FIG. 13, as compared with the antenna 200 of FIG. 2, and these "larger" windings generate a relatively greater amount of current. In effect, the antenna 450 of FIG. 13 may be formed to be longer than the antenna 200 of FIG. 2, thereby generating more electrical current under similar inductive coupling effects. As a result, the antenna 450 formed in multiple antenna planes will enable a greater identification distance for the RFID tag 400 of FIG. 13, as compared with the RFID tag 200 of FIG. 2.

Furthermore, total capacitance C for the resulting multiple antenna plane device will be increased due to the added Z-direction capacitance associated stacked antenna layers, wherein the planar capacitance effects of the antenna 200 in FIG. 2 is limited to the X and Y directions.

Figure 14:
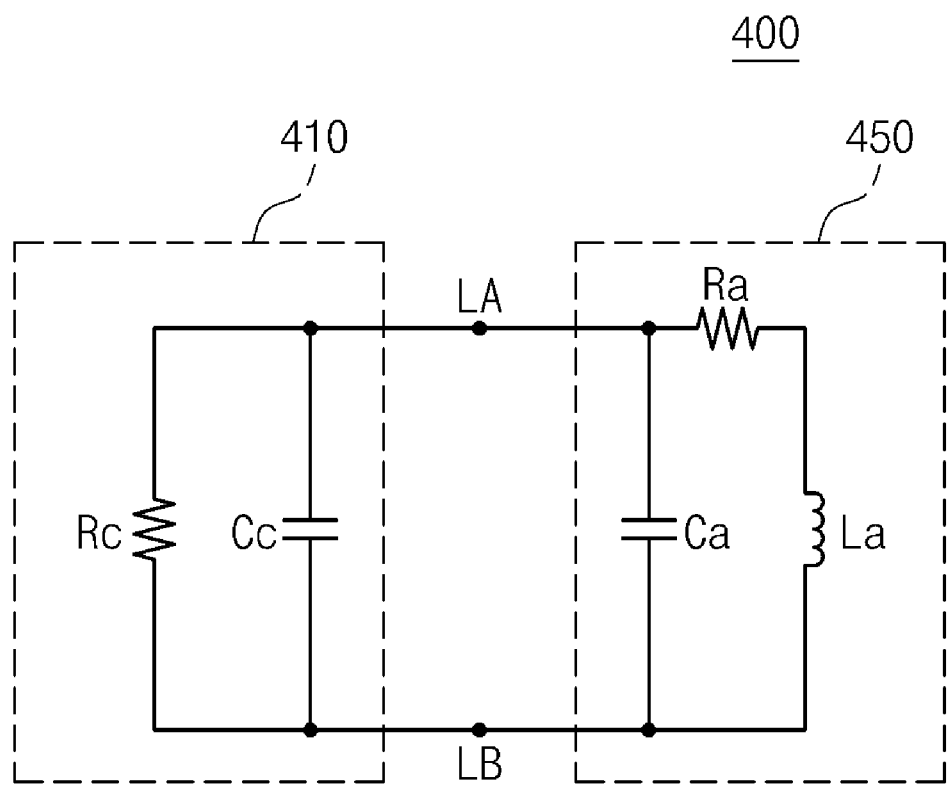
FIG. 14 is a circuit diagram illustrating an equivalent circuit for the RFID tag of FIG. 13.

FIG. 14 is an equivalent circuit diagram for the RFID tag 400 of FIG. 13. Referring to FIG. 14, the microchip 410 in the RFID tag 400 is again modeled by the first resistance Rc and the first capacitance Cc. The antenna 450 formed in both the first and second antenna planes 420 and 430 of the RFID tag 400 may be modeled with second resistor Ra, inductor La, and second capacitance Ca, wherein the second capacitance Ca includes the resulting Z-direction capacitance.

Figure 15:
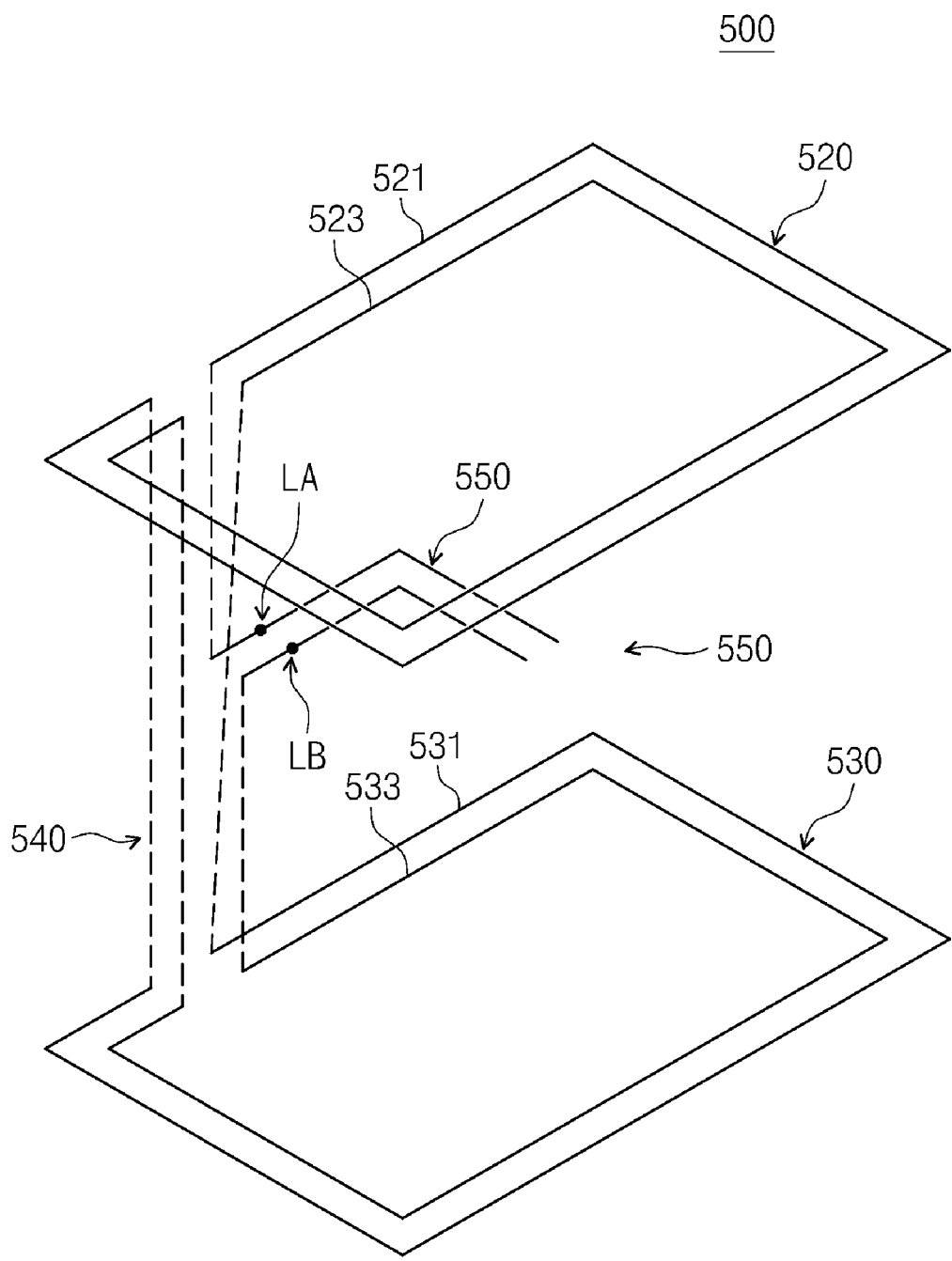
FIG. 15 is a block diagram illustrating a RFID tag having tails as compared with the RFID tag of FIG. 13.
Figure 16:
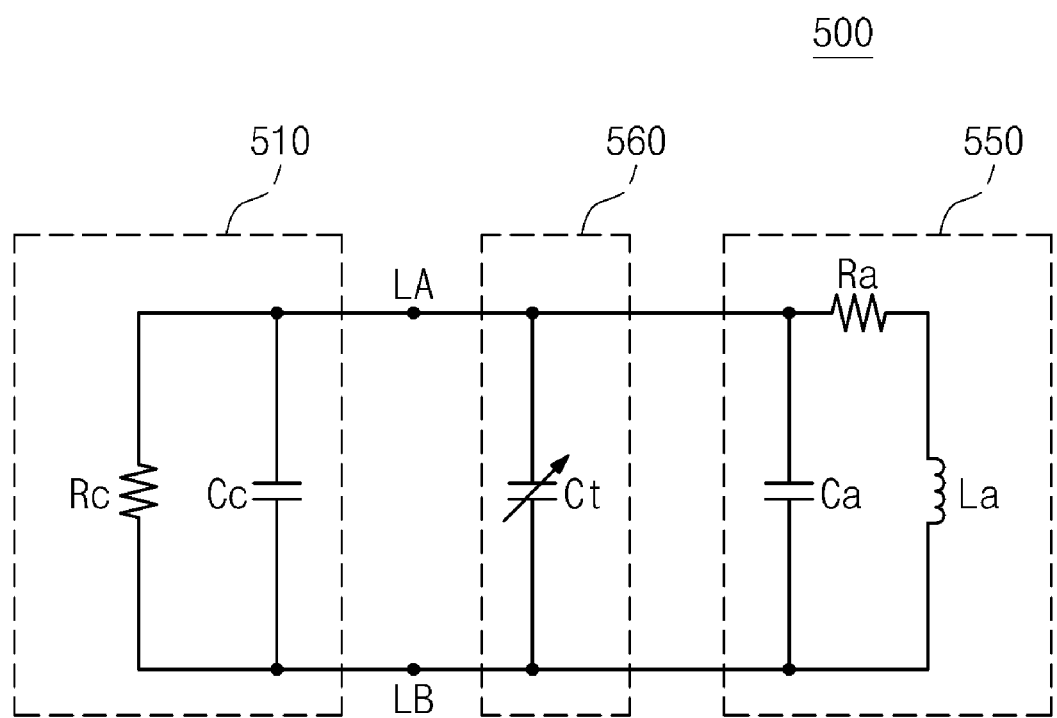
FIG. 16 is a circuit diagram illustrating an equivalent circuit for the RFID tag of FIG. 15.

FIG. 15 is a block diagram illustrating a RFID tag 500 according to yet another embodiment of the inventive concept which is highly analogous to the embodiment described in relation to FIG. 13. However, tails 560 have been added as first and second conductive line segments to the multiple plane antenna 550. FIG. 16 is a corresponding equivalent circuit diagram and the effect of tails 560 on the variable definition of antenna 550 may be understood in the accordance with the discussion had in relation to FIG. 4.

That is, as described with reference to FIGS. 4 to 12, the conductive line segments forming the tails 560 may be selectively trimmed to define a desired total antenna capacitance. And it is possible to adjust the resonance frequency and quality factor of the RFID tag 500 by adjusting the length of the first and second conductive line segments forming the tails 560.

Figure 17:
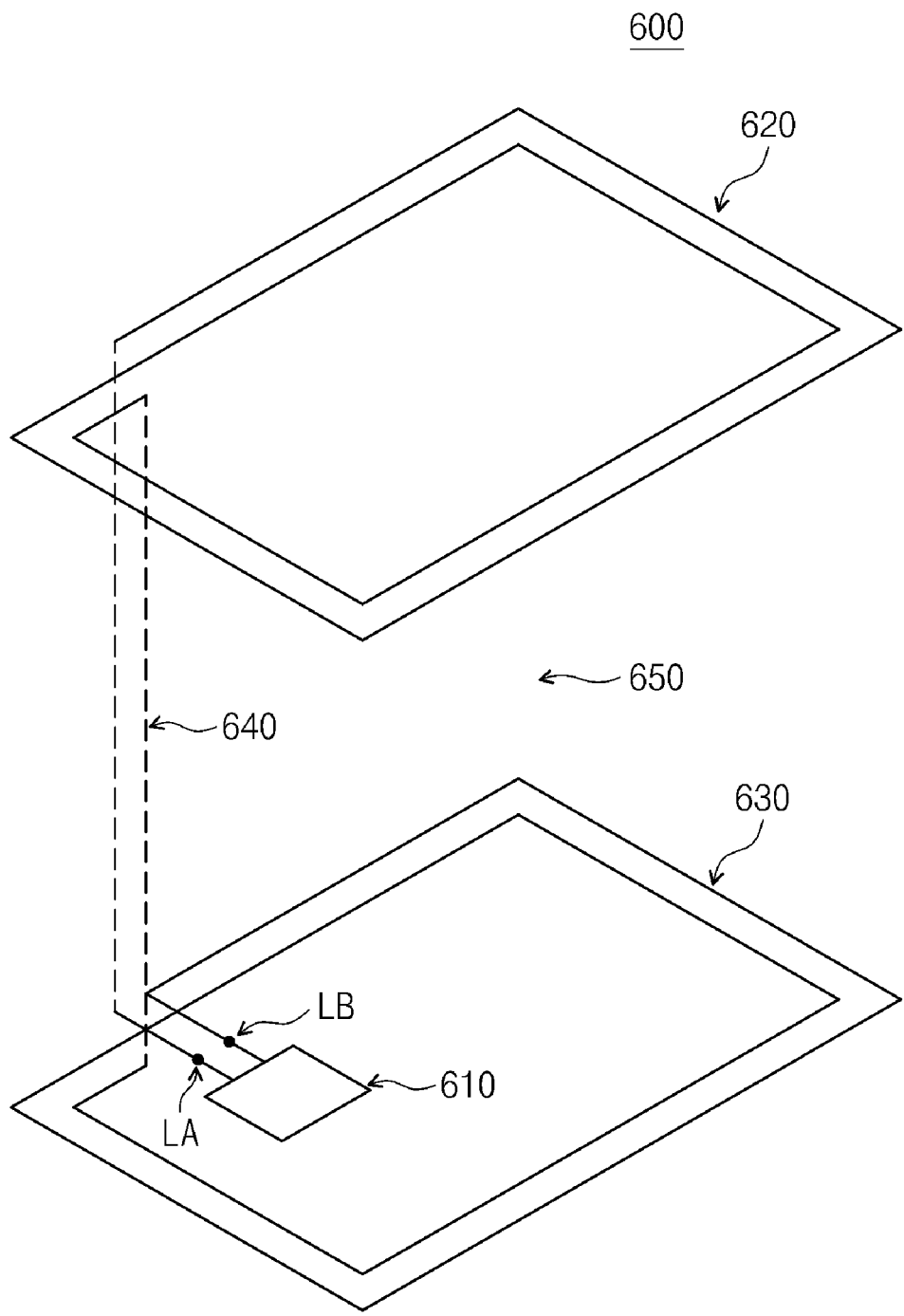
FIG. 17 is a block diagram illustrating a RFID tag of FIG. 13 according to another embodiment of the inventive concept.

FIG. 17 is a block diagram illustrating a RFID tag 600 according to yet another embodiment of the inventive concept which is highly analogous to the embodiment described in relation to FIG. 13. Referring to FIG. 17, the RFID tag 600 comprises a microchip 610 disposed in a lower antenna plane. Again a conductive line extends through first and second antenna planes 620 and 630 to form antenna 650 using through holes 640.

However, each antenna plane 620/630 comprises multiple loop winding connected in series by vertically running through holes 640. Thus, in the RFID tag 600, the conductive line is wound first in either the first or second antenna planes 620 and 630 before extending to the other. For example, the conductive line may begin at the second contact node LB, extend through two concentric windings in the lower antenna plane 630, then extend upwards via the through holes 640, and then extend through two concentric windings in the upper antenna plane 620, before terminating at the first contact node LA.

As described with reference to FIGS. 13 through 16, a RFID tag according to an embodiment of the inventive concept may have its identification distance improved, as compared with an RFID tag having a single plane antenna (e.g., antenna 200 of FIG. 2). It is understood that the RFID tag 600 may further comprise tails connected to the conductive line forming the multiple plane antenna, and that it is possible to vary the resonance frequency and quality factor by adjusting the length of the tails.

With respect to the embodiments illustrated in FIGS. 13 through 17, the various conductive line windings may be made in any reasonable layout or direction. Further, more than two planes may be used to implement an antenna.

In accordance with a RFID tag according to an embodiment of the inventive concept, it is possible to adjust the length conductive line segments added to form a parallel tuning capacitance, of sorts. Thus, it is possible to adjust the resonance frequency and quality factor of the RFID tag.

The above-disclosed subject matter is to be considered illustrative, and not restrictive, and the appended claims are intended to cover all such modifications, enhancements, and other embodiments, which fall within the scope of the following claims. Thus, to the maximum extent allowed by law, the scope is to be determined by the broadest permissible interpretation of the following claims and their equivalents, and shall not be restricted or limited by the foregoing detailed description.

What is claimed is:

1. A radio frequency identifier (RFID) tag comprising:
a microchip having first and second contact nodes;
an antenna formed from a conductive line extending between the first and second contact nodes and characterized by an antenna capacitance and
first and second conductive line segments respectively connected with the first and second contact nodes to form a tail capacitance arranged in parallel with the antenna capacitance across the first and second contact nodes,
wherein the first and second conductive line segments are electrically isolated one from another, extend in parallel with respect to one another from the first and second contact nodes, and respectively include an open distal end furthest from the first and second contact node to define the tail capacitance.

2. The radio frequency identifier tag of claim 1, wherein the first and second conductive line segments are configured to be selectively trimmed in length following fabrication of the RFID to vary the tail capacitance.

3. The radio frequency identifier tag of claim 2, wherein the first and second conductive line segments are configured to be selectively trimmed by physically cutting the first and second conductive line segments.

4. The radio frequency identifier tag of claim 2, wherein the first and second conductive line segments extend in a square wave pattern.

5. The radio frequency identifier tag of claim 2, wherein the first and second conductive line segments extend in a sine wave pattern.

6. The radio frequency identifier tag of claim 1, wherein the antenna is fabricated in different first and second antenna planes, wherein the first and second antenna planes are disposed in parallel with respect to one another.

7. The radio frequency identifier tag of claim 6, wherein the antenna comprises a first conductive line disposed in the first antenna plane and wound in a first direction, and a second conductive line disposed in the second antenna plane and wound in a second direction different from the first direction.

8. The radio frequency identifier tag of claim 7, wherein the first conductive line comprises multiple loop windings, the second conductive line comprises multiple loop windings, and the first and second conductive lines are connected in series via at least one through hole.

9. The radio frequency identifier tag of claim 6, wherein the antenna is fabricated in a first winding of the conductive line arranged in the first antenna plane and a second winding of the conductive line arranged in the second antenna plane, such that the first and second windings are further arranged in a vertical alignment one above the other.

10. The radio frequency identifier tag of claim 1, wherein the antenna is formed by a plurality of concentric windings of the conductive line, such that the antenna is physically contained within a substantially rectangular, two-dimensional antenna area, and the first and second conductive line segments are fully contained within the antenna area.

11. A method of fabricating a radio frequency identifier (RFID) tag, comprising:
    electrically connecting a conductive line between first and second contact nodes of a microchip to form an antenna having an antenna capacitance; and
    electrically and respectively connecting first and second conductive line segments to only the first and second contact nodes, such that the first and second conductive line segments are electrically isolated from one another, are arranged in parallel with one another, and respectively include an open distal end furthest from the first and second contact nodes to form a tail capacitance, wherein the tail capacitance is arranged in parallel with the antenna capacitance across the first and second contact nodes.

12. The method of claim 11, further comprising:
    varying the length of the first and second conductive line segments following fabrication of the RFID to vary the tail capacitance.

13. The method of claim 12, wherein varying the length of the first and second conductive line segments comprises physically cutting the first and second conductive line segments.

14. The method of claim 12, wherein the first and second conductive line segments extend in a square wave pattern.

15. The method of claim 12, wherein the first and second conductive line segments extend in a sine wave pattern.

16. The method of claim 11, wherein the antenna is formed in different first and second antenna planes, wherein the first and second antenna planes are disposed in parallel with respect to one another.

17. The method of claim 16, wherein the antenna comprises a first conductive line disposed in the first antenna plane and wound in a first direction, and a second conductive line disposed in the second antenna plane and wound in a second direction different from the first direction.

18. The method of claim 17, wherein the first conductive line comprises multiple loop windings, the second conductive line comprises multiple loop windings, and the first and second conductive lines are connected in series via at least one through hole.

19. The method of claim 16, wherein electrically connecting the conductive line between the first and second contact nodes comprises forming a plurality of concentric windings of the conductive line, such that the antenna is physically contained within a substantially rectangular, two-dimensional antenna area, and the first and second conductive line segments are fully contained within the antenna area.

20. The method of claim 16, wherein the antenna is formed in a first winding of the conductive line arranged in the first antenna plane and a second winding of the conductive line arranged in the second antenna plane, such that the first and second windings are further arranged in a vertical alignment one above the other.

* * * * *